US008189557B2

(12) United States Patent
Onggosanusi et al.

(10) Patent No.: US 8,189,557 B2
(45) Date of Patent: May 29, 2012

(54) SECONDARY SYNCHRONIZATION CHANNEL DESIGN FOR OFDMA SYSTEMS

(75) Inventors: Eko N. Onggosanusi, Allen, TX (US); Anand G. Debak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1001 days.

(21) Appl. No.: 12/036,262

(22) Filed: Feb. 24, 2008

(65) Prior Publication Data

US 2008/0205375 A1    Aug. 28, 2008

Related U.S. Application Data

(60) Provisional application No. 60/891,339, filed on Feb. 23, 2007, provisional application No. 60/939,737, filed on May 23, 2007.

(51) Int. Cl.
*H04J 3/06* (2006.01)

(52) U.S. Cl. ........ 370/350; 370/345; 370/310; 455/464; 455/502

(58) Field of Classification Search .................. 370/351, 370/389, 400, 401
See application file for complete search history.

(56) References Cited

U.S. PATENT DOCUMENTS

| | | | |
|---|---|---|---|
| 2002/0150188 A1* | 10/2002 | Rudolf | 375/354 |
| 2003/0193926 A1* | 10/2003 | Lindoff et al. | 370/350 |
| 2004/0085946 A1* | 5/2004 | Morita et al. | 370/342 |
| 2006/0268808 A1* | 11/2006 | Kang | 370/342 |
| 2007/0041348 A1 | 2/2007 | Kwun et al. | |
| 2007/0076668 A1* | 4/2007 | Tirkkonen et al. | 370/335 |
| 2007/0133390 A1* | 6/2007 | Luo et al. | 370/208 |
| 2008/0107086 A1* | 5/2008 | Fukuta et al. | 370/335 |
| 2008/0132263 A1* | 6/2008 | Yu et al. | 455/515 |
| 2008/0144600 A1* | 6/2008 | Anderson | 370/350 |
| 2008/0240285 A1* | 10/2008 | Han et al. | 375/295 |
| 2008/0273491 A1* | 11/2008 | Han et al. | 370/329 |
| 2008/0273582 A1* | 11/2008 | Gaal et al. | 375/224 |

OTHER PUBLICATIONS

Kim et al, Synchronization and Cell-Search Technique Using Preamble for OFDM Cellular Systems, IEEE transactions on Vehicular Technology, Nov. 2007.*
Lee et al, An Initial Cell Search Scheme Robust to Frequency Error in W-CDMA System, IEEE, 2000.*
3GPP TSG RAN WG1 #45, May 8-12, 2006, Texas Instruments, Proposal for DL SYNC channel (SCH) for E-UTRA.*
3GPP TSG-RAN1 WG1 #42bis,Oct. 10-14, 2005,ZTE, TP for Downlink Synchronization Channel Schemes for E-UTRA.*

* cited by examiner

*Primary Examiner* — Hassan Phillips
*Assistant Examiner* — Gautam Sharma
(74) *Attorney, Agent, or Firm* — Ronald O. Neerings; Wade James Brady, III; Frederick J. Telecky, Jr.

(57) ABSTRACT

Embodiments of the present disclosure provide a transmitter, a receiver and methods of operating a transmitter and a receiver. In one embodiment, the transmitter for use in a base station of an OFDMA system and includes a primary module configured to provide a primary synchronization signal that furnishes a partial cell identity. Additionally, the transmitter also includes a secondary module configured to provide a secondary synchronization signal that furnishes a cell identity group and one or more cell-specific parameters based on using a two-segment secondary synchronization sequence. The transmitter further includes a transmit module configured to transmit the primary and secondary synchronization signals.

28 Claims, 3 Drawing Sheets

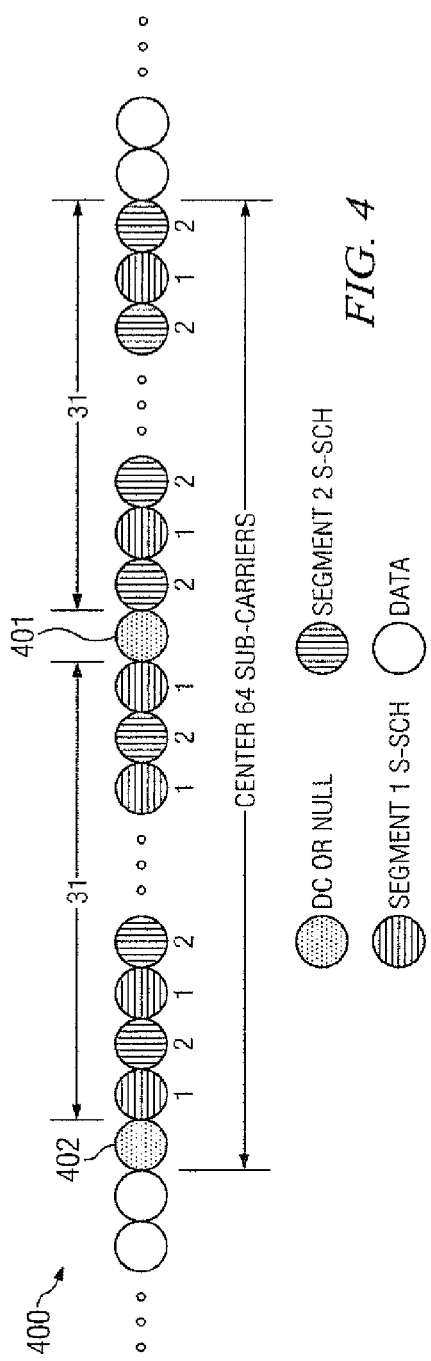
FIG. 4
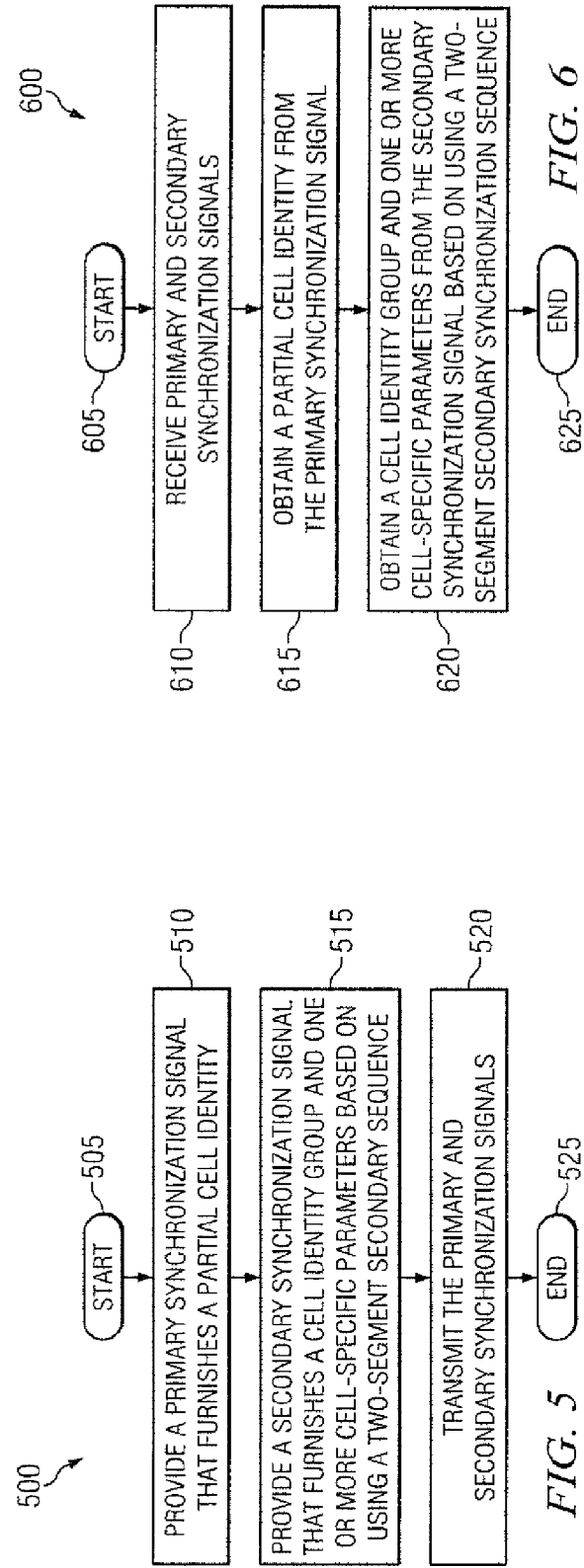
FIG. 6
FIG. 5

SECONDARY SYNCHRONIZATION CHANNEL DESIGN FOR OFDMA SYSTEMS

CROSS-REFERENCE TO PROVISIONAL APPLICATION

This application claims the benefit of U.S. Provisional Application No. 60/891,339 entitled "Secondary SYNC Channel (S-SCH) Design for 3GPP LTE OFDMA" to Eko N. Onggosanusi and Anand G. Dabak filed on Feb. 23, 2007, which is incorporated herein by reference in its entirety.

This application also claims the benefit of U.S. Provisional Application No. 60/939,737 entitled "Secondary SYNC Channel (S-SCH) Design for 3GPP LTE OFDMA" to Eko N. Onggosanusi and Anand G. Dabak filed on May 23, 2007, which is incorporated herein by reference in its entirety.

TECHNICAL FIELD

The present disclosure is directed, in general, to a communication system and, more specifically, to a transmitter, a receiver and methods of operating the transmitter and receiver.

BACKGROUND

In a cellular network, such as one employing orthogonal frequency division multiple access (OFDMA), each cell employs a base station that communicates with user equipment, such as a cell phone, a laptop, or a PDA, that is actively located within its cell. When the user equipment is first turned on, it has to do an initial cell search in order to be connected to the cellular network. This involves a downlink synchronization process between the base station and the user equipment wherein the base station sends a synchronization signal to the user equipment. In addition, as the moving user equipment approaches a cell boundary between two adjoining cells, it performs a neighboring cell search in preparation to handover its activation from the initial cell to the neighboring cell. Improvements in the synchronization process would prove beneficial in the art.

SUMMARY

Embodiments of the present disclosure provide a transmitter, a receiver and methods of operating a transmitter and a receiver. In one embodiment, the transmitter for use in a base station of an OFDMA system and includes a primary module configured to provide a primary synchronization signal that furnishes a partial cell identity. Additionally, the transmitter also includes a secondary module configured to provide a secondary synchronization signal that furnishes a cell identity group and one or more cell-specific parameters based on using a two-segment secondary synchronization sequence. The transmitter further includes a transmit module configured to transmit the primary and secondary synchronization signals. In one embodiment, the receiver is for user equipment in an OFDMA system and includes a receive module configured to receive primary and secondary synchronization signals. The receiver also includes a primary processing module configured to obtain a partial cell identity from the primary synchronization signal. The receiver further includes a secondary processing module configured to obtain a cell identity group and one or more cell-specific parameters from the secondary synchronization signal based on using a two-segment secondary synchronization sequence.

In another aspect, the present disclosure provides a method of operating a transmitter for a base station in an OFDMA system. In one embodiment, the method includes providing a primary synchronization signal that furnishes a partial cell identity and providing a secondary synchronization signal that furnishes a cell identity group and one or more cell-specific parameters based on using a two-segment secondary synchronization sequence. The method also includes transmitting the primary and secondary synchronization signals. In one embodiment, the method of operating a receiver is for user equipment in an OFDMA system and includes receiving primary and secondary synchronization signals. The method also includes obtaining a partial cell identity from the primary synchronization signal and obtaining a cell identity group and one or more cell-specific parameters from the secondary synchronization signal based on using a two-segment secondary synchronization sequence.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION OF THE DRAWINGS

For a more complete understanding of the present disclosure, reference is now made to the following descriptions taken in conjunction with the accompanying drawings, in which:

FIG. 4 illustrates an embodiment of an S-SCH mapping based on employing two segments and constructed according to the principles of the present disclosure;

FIG. 5 illustrates a flow diagram of an embodiment of a method of operating a transmitter carried out in accordance with the principles of the present disclosure; and FIG. 6 illustrates a flow diagram of an embodiment of a method of operating a receiver carried out in accordance with the principles of the present disclosure.

DETAILED DESCRIPTION

Figure 1:
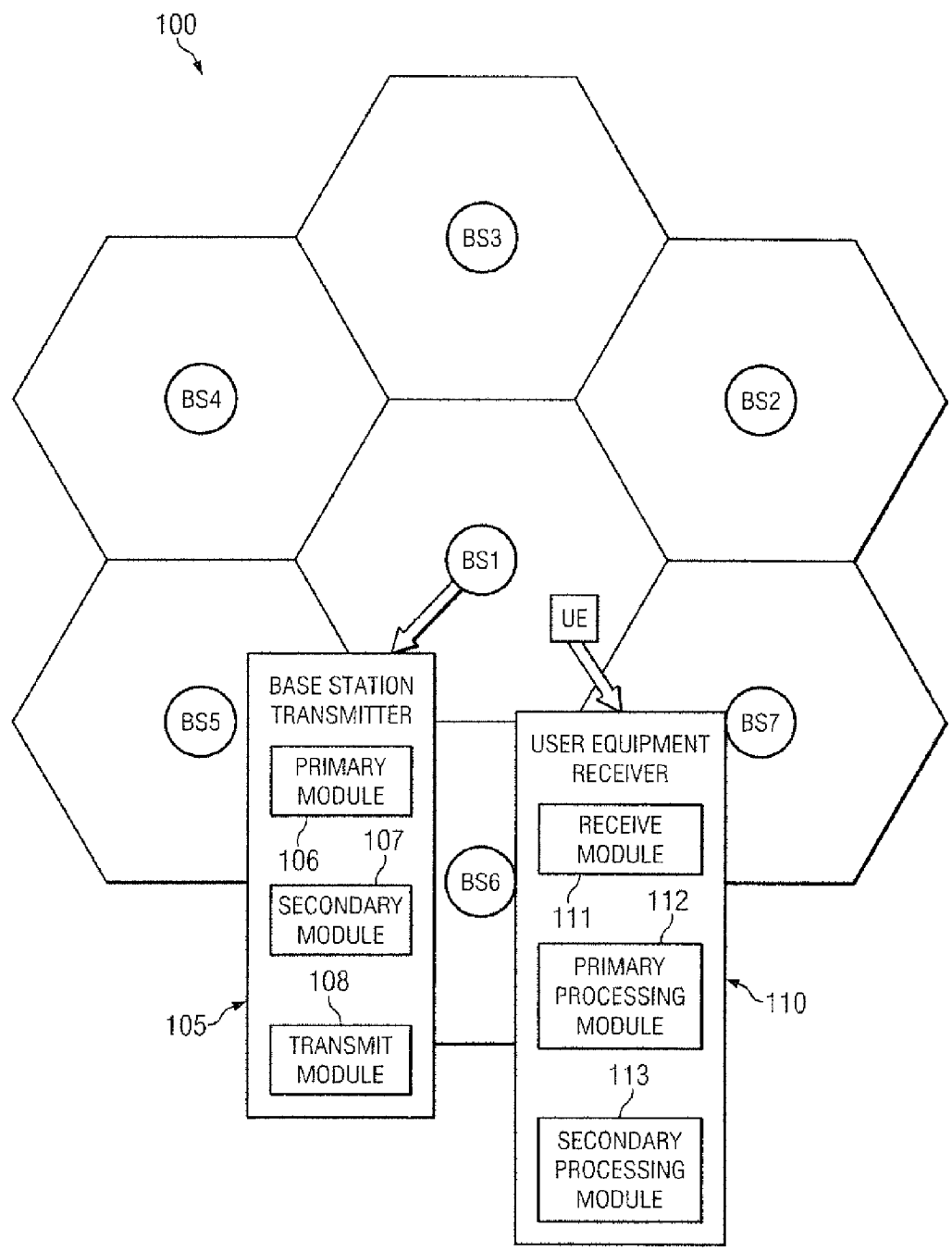
FIG. 1 illustrates a diagram of an embodiment of a cellular network constructed according to the principles of the present disclosure.

FIG. 1 illustrates an exemplary diagram of an embodiment of a cellular network 100 constructed according to the principles of the present disclosure. The cellular network 100 is part of an OFDMA system and includes a cellular grid having a centric cell and six surrounding first-tier cells. The centric cell employs a centric base station BS1, and the surrounding first-tier cells employ first-tier base stations BS2-BS7, as shown.

The centric base station BS1 includes a base station transmitter 105 having a primary module 106, a secondary module 107 and a transmit module 108. The cellular network 100 also includes user equipment UE operating within the centric cell, wherein the centric base station BS1 acts as a serving base station to the UE. The UE includes a UE receiver 110 having a receive module 111, a primary processing module 112 and a secondary processing module 113.

In the base station transmitter 105 the primary module 106 is configured to provide a primary synchronization signal that furnishes a partial cell identity. The secondary module 107 is configured to provide a secondary synchronization signal that furnishes a cell identity group and one or more cell-specific parameters based on using a two-segment secondary synchronization sequence. The transmit module 108 is configured to transmit the primary and secondary synchronization signals.

In the UE receiver 110, the receive module 111 is configured to receive primary and secondary synchronization signals. The primary processing module 112 is configured to obtain a partial cell identity from the primary synchronization signal. The a secondary processing module 113 is configured to obtain a cell identity group and one or more cell-specific parameters from the secondary synchronization signal based on using a two-segment secondary synchronization sequence.

Figure 2:
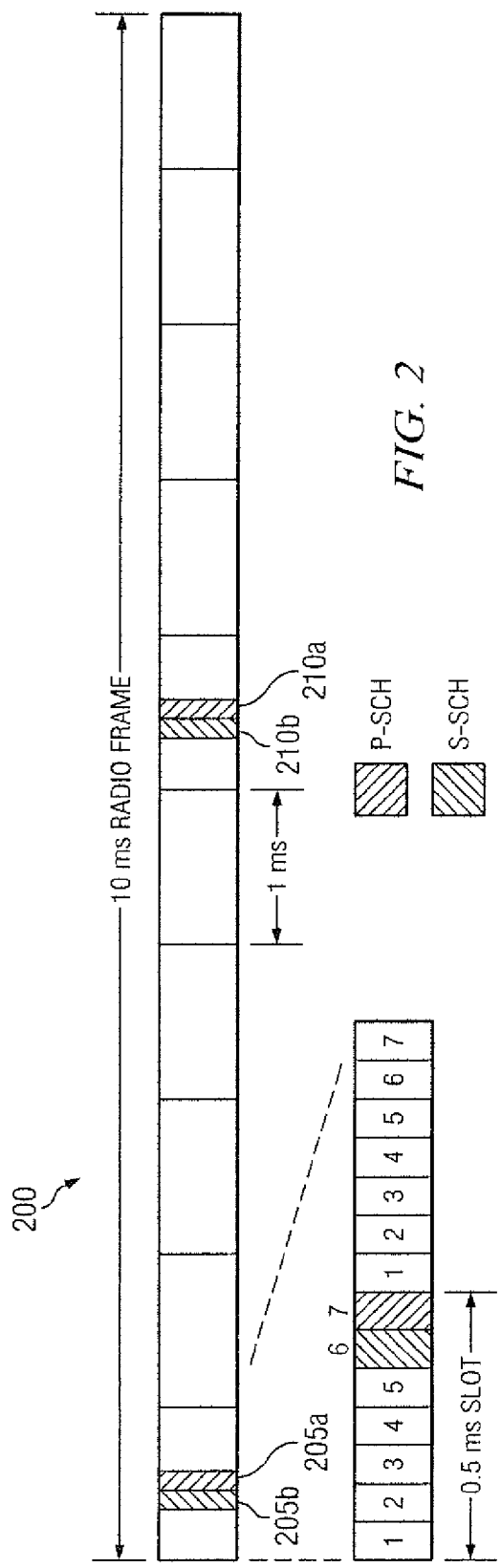
FIG. 2 illustrates a diagram of a downlink radio frame that includes a downlink synchronization signal constructed according to the principles of the present disclosure.

FIG. 2 illustrates a diagram of a downlink radio frame 200 that includes a downlink synchronization signal constructed according to the principles of the present disclosure. The downlink radio frame 200 may be employed in a cellular network, such as the cellular network 100 of FIG. 1, and includes two synchronization signals 205, 210 wherein each consists of a primary synchronization signal (also referred to as P-SCH) 205a or 210a and a secondary synchronization signal (also referred to as S-SCH) 205b or 210b that are located as shown. One P-SCH 205a or 210a and one corresponding S-SCH 205b or 210b symbol are transmitted every 5 ms epoch, as shown. Design of the synchronization signals to enable fast cell search is required for long-term evolution (LTE) of 3GPP.

The underlying code for the P-SCH 205a or 210a is called a primary synchronization sequence (PSS). The PSS for each cell is chosen from three sequences and is tied to the cell identity (ID) within a certain group of cell IDs. Hence, the PSS conveys partial cell ID information and one P-SCH symbol carries three cell ID hypotheses. The underlying code for the S-SCH 205b or 210b is called the secondary synchronization sequence (SSS). The S-SCH 205b or 210b carries cell-specific information. The following cell-specific information may be carried in one S-SCH symbol.

A total of 504 cell IDs are supported in LTE. Since three cell ID hypotheses are carried in the P-SCH 205, 168 cell ID groups (168 hypotheses) are provided. Additionally, since there are two S-SCH symbols per radio frame 200 (one in the first slot, and another one in the eleventh slot), a radio frame timing indicator (2 hypotheses) is also provided. In some embodiments, a frequency hopping indicator for a downlink reference signal (2 hypotheses) may be provided that indicates if frequency hopping is employed within the radio frame 200. Additionally, an antenna configuration of transmitter (TX) diversity indicator (2 or 3 hypotheses) may also be provided that indicates either the antenna configuration or TX diversity employed by the broadcast channel (BCH).

The S-SCH may be detected coherently (by using the P-SCH as a phase reference) or non-coherently (without phase reference). This option is considered for the S-SCH in the following embodiments. In general, coherent detection yields better performance. Additionally, a two-segment SSS is employed where two groups of M-sequences with half-length (31) may be used to construct a large number of composite sequences. The two sequences may also be interleaved.

Referring again to FIG. 1, the following constraints may be imposed. For each S-SCH symbol, the UE has the flexibility to detect the cell ID group (1 out of 168 hypotheses) and the frame timing indicator (1 out of 2 hypotheses) either coherently or non-coherently. Since the antenna configuration and the existence of frequency hopping can also be detected via the downlink reference signal (DL RS), the detection of at least one of the two parameters from the S-SCH can be made optional. The optional parameters do not need to have the same detection flexibility as that for the cell ID group and frame timing indicator.

With the above constraints, the following solution may be implemented. Encode the radio frame timing indicator (2 hypotheses) in the SSS indices along with the cell ID group (168 hypotheses). Hence, both the parameters can be detected either coherently or non-coherently. Therefore, these two parameters are S-SCH-mandatory parameters.

For the case that the antenna configuration detection via S-SCH is optional, a phase modulation (i.e., applying a common phase rotation across all the S-SCH samples) can be applied to encode the antenna configuration information. This implies that if S-SCH is used for antenna configuration detection, the antenna configuration is detected coherently (i.e., non-coherent S-SCH detection does not apply). Otherwise, the antenna configuration information is S-SCH mandatory and hence is encoded in the SSS indices.

For the case that the DL RS hopping detection via S-SCH is optional, a phase modulation can be applied to encode the hopping indicator information. This implies that S-SCH is used for hopping indicator detection wherein the hopping indicator is detected coherently (i.e., non-coherent S-SCH detection does not apply). Otherwise, the hopping indicator is S-SCH-mandatory and is therefore encoded in the SSS indices.

This, of course, does not preclude the following possibilities for the antenna configuration and the hopping indicator. Both may employ a joint phase modulation. One of them is not included at all in the S-SCH. Hence, this parameter is blindly detected via the DL RS (i.e., blind detection is the only option). This provides the following advantages.

The S-SCH-optional parameter(s) do not affect the detection performance of the S-SCH-mandatory parameters. This is because the minimum-distance property of the SSS is not affected. The detection of S-SCH-optional parameter(s) does not significantly increase the complexity compared to encoding them in the SSS indices. The UE has the option of detecting the S-SCH-optional parameter(s) via the DL RS (blindly). This is especially relevant when the UE decides to employ non-coherent S-SCH detection, which is sub-optimal.

The frequency-domain composite S-SCH signal X(k) can be written as $$X(k) = S(k)\exp(j\theta)$$

$$S(k) \in \{S_0(k), S_1(k), \ldots, S_{N-1}(k)\}.$$

$$\theta \in \{\theta_0, \theta_1, \ldots, \theta_{M-1}\} \qquad (1)$$

Here, S(k) denotes the SSS in the frequency-domain, where k denotes the kth OFDM sub-carrier. Note that the phase modulation is not frequency-dependent and is simply a multiplicative constant (i.e., a common phase rotation across all the S-SCH symbols).

Although any arbitrary set of phases can be used in (1), the expression $$\theta_m = \frac{2\pi m}{M} + \varphi \qquad (2)$$

seems to be a sensible choice from a minimum-distance perspective. Here, Φ is a fixed phase offset, which can also be zero or arbitrary. For example, with M=4 and $$\varphi = \frac{\pi}{4},$$

QPSK modulation is obtained.

If the UE decides to detect the S-SCH-optional parameters via the S-SCH by employing coherent detection, the UE can simply add an additional step as follows. Obtain the frequency-domain phase reference (channel estimate) from the P-SCH and multiply the S-SCH in the frequency-domain by the complex conjugate of the phase reference →Y(k). Then, correlate Y(k) with all the N candidates of S(k) to obtain the correlation statistics $\{R_0, R_1, \ldots, R_{N-1}\}$. The S-SCH-mandatory parameters can be detected by finding the maximum of the N correlation statistics $\hat{n}=\arg\max_n |R_n|$. Additionally, detect the phase of $R_{\hat{n}}$. This can be done by performing an M-value hypothesis testing based on $R_{\hat{n}}$.

The following alternatives shown in Tables 1 and 2 may be supported in the S-SCH design (see equations (1) and (2)). The cell ID group (168 hypotheses) and radio frame timing (2 hypotheses) are S-SCH mandatory.

TABLE 1

| Antenna configuration | Hopping indicator | N (no. hypotheses encoded as SSS indices) | M (no. hypotheses encoded as phase modulation) | Total no. hypotheses in S-SCH |
|---|---|---|---|---|
| S-SCH mandatory | S-SCH mandatory | 336 × 2 × 2 = 1344 | 1 | 1344 |
| S-SCH mandatory | S-SCH optional | 336 × 2 = 672 | 2 | 1344 |
| S-SCH optional | S-SCH mandatory | 336 × 2 = 672 | 2 | 1344 |
| S-SCH optional | S-SCH optional | 336 | 2 × 2 = 4 | 1344 |
| S-SCH mandatory | No S-SCH encoding | 336 × 2 = 672 | 1 | 672 |
| S-SCH optional | No S-SCH encoding | 336 | 2 | 672 |
| No S-SCH encoding | S-SCH mandatory | 336 × 2 = 672 | 1 | 672 |
| No S-SCH encoding | S-SCH optional | 336 | 2 | 672 |
| No S-SCH encoding | No S-SCH encoding | 336 | 1 | 336 |

TABLE 2

| Antenna configuration | Hopping indicator | N (no. hypotheses encoded as SSS indices) | M (no. hypotheses encoded as phase modulation) | Total no. hypotheses in S-SCH |
|---|---|---|---|---|
| S-SCH mandatory | S-SCH mandatory | 336 × 3 × 2 = 2016 | 1 | 2016 |
| S-SCH mandatory | S-SCH optional | 336 × 3 = 1008 | 2 | 2016 |
| S-SCH optional | S-SCH mandatory | 336 × 2 = 672 | 3 | 2016 |

TABLE 2-continued

| Antenna configuration | Hopping indicator | N (no. hypotheses encoded as SSS indices) | M (no. hypotheses encoded as phase modulation) | Total no. hypotheses in S-SCH |
|---|---|---|---|---|
| S-SCH optional | S-SCH optional | 336 | 3 × 2 = 6 | 2016 |
| S-SCH mandatory | No S-SCH encoding | 336 × 3 = 1008 | 1 | 1008 |
| S-SCH optional | No S-SCH encoding | 336 | 3 | 1008 |
| No S-SCH encoding | S-SCH mandatory | 336 × 2 = 672 | 1 | 672 |
| No S-SCH encoding | S-SCH optional | 336 | 2 | 672 |
| No S-SCH encoding | No S-SCH encoding | 336 | 1 | 336 |

As an example, if the antenna configuration (3 hypotheses) is made S-SCH-optional and the hopping indicator is S-SCH mandatory, then the following example may be employed.

$$X(k) = S(k)\exp(j\theta) \qquad (3)$$

$$S(k) \in \{S_0(k), S_1(k), \ldots, S_{N-1}(k)\}$$

$$\theta \in \left\{0, \frac{2\pi}{3}, \frac{4\pi}{3}\right\}.$$

Here, N=672 and no constant phase shift is applied. If the hopping indicator is not encoded in the S-SCH, there are instead N=336.

A number of variations of the above schemes are within the scope of the present disclosure, as well. For example, the number of hypotheses for each of the cell-specific parameters may be altered without affecting the applicability of the basic concepts introduced in this disclosure. Furthermore, other cell-specific parameters can also be included in the S-SCH, whether in the SSS indices or in the form of phase modulation.

Figure 3:
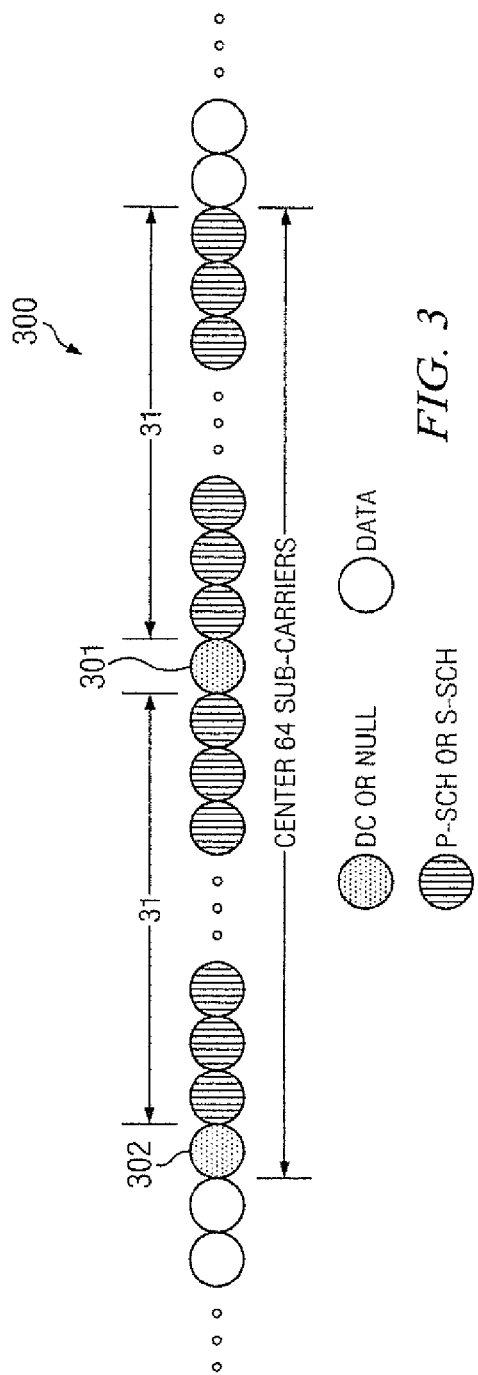
FIG. 3 illustrates a FIG. 3 illustrates an embodiment of primary or secondary synchronization signals constructed according to the principles of the present disclosure.

FIG. 3 illustrates an embodiment of primary or secondary synchronization signals 300 constructed according to the principles of the present disclosure. FIG. 3 shows a mapping in the frequency domain of the primary or secondary synchronization signals (P-SCH, S-SCH) 300 that occupies a center 64 sub-carriers, as shown. The mapping includes a DC sub-carrier 301 and a Null sub-carrier 302. The mapping also includes sub-carriers for either all of the P-SCH sub-carriers or all of the S-SCH sub-carriers and the data sub-carriers, as shown. This mapping assumes that there are 32 sub-carriers to the left of the DC sub-carrier 301 and 31 sub-carriers to the right of it. Alternatively, if there are 32 sub-carriers to the right of the DC sub-carrier 301 and 31 to the left, The Null sub-carrier 302 is at the right-most part of the center 64 sub-carriers instead of the left-most part.

Since coherent SSS detection offers better performance than non-coherent detection in most scenarios, the P-SCH and S-SCH designs accommodate accurate coherent SSS detection. Additionally, since the P-SCH is used as a phase reference (to provide channel estimates) for decoding the SSS (demodulating the S-SCH), the S-SCH occupies exactly the same (if not, almost the same) set of sub-carriers as the P-SCH.

In the embodiment of FIG. 3 for an LTE system, the P-SCH occupies the center 64 sub-carriers including the DC sub-carrier 301. This is chosen to enable low complexity cell search (size-64 FFT, ½×sampling rate). Consequently, the S-SCH is designed to occupy the center 64 sub-carriers including the DC sub-carrier 301. In particular, if the P-SCH is designed to occupy only 62 out of 63 non-DC sub-carriers, the S-SCH design is embodied in the same manner. In addition, this also fits well with the two-segment interleaved S-SCH design since 62 is an even number as discussed with respect to FIG. 4.

FIG. 4 illustrates an embodiment of an S-SCH mapping 400 based on employing two segments and constructed according to the principles of the present disclosure. The S-SCH mapping 400 occupies the center 64 sub-carriers as discussed with respect to FIG. 3. The mapping includes the DC sub-carrier 401, the Null sub-carrier 402 and data sub-carriers, as before. Here, the mapping shows an interleaving of sub-carriers representing segments 1 and 2 of a two-segment interleaved S-SCH.

In this case, the underlying S-SCH sequence is of length-31 (two length-31 sequences interleaved in the frequency domain). Several natural candidates are M-sequences (PN sequences), Gold sequences, and truncated Walsh sequences. With Walsh sequences, the underlying length is 32, with one sample truncated. Other designs are also possible.

Assuming the underlying sequence length of 31, there are a total of 961 available sequences. Depending on the total number of hypotheses, a subset of those sequences may be selected. For instance, with 336 hypotheses, 18 and 19 Walsh or M-sequences can be used for segments 1 and 2 (or segments 2 and 1), respectively. With 672 hypotheses, 26 and 27 Walsh or M-sequences can be used for segments 1 and 2 (or segments 2 and 1), respectively. For enhanced performance, the set of sequences used for segments 1 and 2 should be as different as possible. For example, if 336 hypotheses is required, {W0, W1, ..., W17} can be used for segment 1 and {W13, W14, ..., W17, W18, ..., W31} for segment 2.

Furthermore, a common scrambling (common to all SSS candidates) can be applied to reduce the peak-to-average power ratio (PAPR) or cubic metric (e.g., a Golay sequence, a pseudorandom or a poly-phase CAZAC sequence). Additionally, two scrambling schemes may be used that apply the same length-31 scrambling sequences to segments 1 and 2 or that apply different length-31 sequences to segments 1 and 2 (i.e., effectively having one length-62 scrambling).

FIG. 5 illustrates a flow diagram of an embodiment of a method of operating a transmitter 500 carried out in accordance with the principles of the present disclosure. The method 500 is for use with a base station in an OFDMA system and starts in a step 505. Then, a primary synchronization signal that furnishes a partial cell identity is provided in a step 510. A secondary synchronization signal that furnishes a cell identity group and one or more cell-specific parameters based on using a two-segment secondary synchronization sequence is provided in a step 515.

In one embodiment, the primary and secondary synchronization signals occupy substantially a same set of centric frequency sub-carriers for their respective signals. Additionally, the two-segment secondary synchronization sequence provides first and second sequences that are interleaved in the frequency domain. Additionally, the two-segment secondary synchronization sequence provides first and second sequences that are length-31 binary M-sequences.

In one embodiment, a phase rotation encoding of at least one of the one or more cell-specific parameters is applied to the secondary synchronization signal. Additionally, at least one of the one or more cell-specific parameters is jointly encoded with the cell identity group. Correspondingly, at least one of the one or more cell-specific parameters indicates frame timing. Also, at least one of the one or more cell-specific parameters indicates antenna configuration. The primary and secondary synchronization signals are transmitted in a step 520, and the method 500 ends in a step 525.

FIG. 6 illustrates a flow diagram of an embodiment of a method of operating a receiver 600 carried out in accordance with the principles of the present disclosure. The method 600 is for use with user equipment in an OFDMA system and starts in a step 605. Then, primary and secondary synchronization signals are received in a step 610. A partial cell identity from the primary synchronization signal is obtained in a step 615, and a cell identity group and one or more cell-specific parameters from the secondary synchronization signal based on using a two-segment secondary synchronization sequence is obtained in a step 620.

In one embodiment, the primary and secondary synchronization signals occupy substantially a same set of centric frequency sub-carriers for their respective signals. Additionally, the two-segment secondary synchronization sequence provides first and second sequences that are interleaved in the frequency domain. Also, the two-segment secondary synchronization sequence provides first and second sequences that are length-31 binary M-sequences.

In one embodiment, a phase rotation encoding of at least one of the one or more cell-specific parameters is applied to the secondary synchronization signal. Additionally, at least one of the one or more cell-specific parameters is jointly encoded with the cell identity group. Correspondingly, at least one of the one or more cell-specific parameters indicates frame timing. Also, at least one of the one or more cell-specific parameters indicates antenna configuration. The method 600 ends in a step 625.

While the methods disclosed herein have been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which the disclosure relates will appreciate that other and further additions, deletions, substitutions and modifications may be made to the described example embodiments without departing from the disclosure.

What is claimed is:

1. A transmitter for a base station in an OFDMA system, comprising:
   a primary module configured to provide a primary synchronization signal that furnishes a partial cell identity;
   a secondary module configured to provide a secondary synchronization signal that furnishes a cell identity group and one or more cell-specific parameters based on using a two-segment secondary synchronization sequence, wherein the primary and secondary synchronization signals occupy substantially a same set of centric frequency sub-carriers for their respective signals; and
   a transmit module configured to transmit the primary and secondary synchronization signals.

2. A transmitter for a base station in an OFDMA system, comprising:
   a primary module configured to provide a primary synchronization signal that furnishes a partial cell identity;
   a secondary module configured to provide a secondary synchronization signal that furnishes a cell identity group and one or more cell-specific parameters based on using a two-segment secondary synchronization sequence, wherein the two-segment secondary synchronization sequence provides first and second sequences that are interleaved in the frequency domain; and a transmit module configured to transmit the primary and secondary synchronization signals.

3. A transmitter for a base station in an OFDMA system, comprising:
   a primary module configured to provide a primary synchronization signal that furnishes a partial cell identity;
   a secondary module configured to provide a secondary synchronization signal that furnishes a cell identity group and one or more cell-specific parameters based on using a two-segment secondary synchronization sequence, wherein the two-segment secondary synchronization sequence provides first and second sequences that are length—31 binary M-sequences; and
   a transmit module configured to transmit the primary and secondary synchronization signals.

4. A transmitter for a base station in an OFDMA system, comprising:
   a primary module configured to provide a primary synchronization signal that furnishes a partial cell identity;
   a secondary module configured to provide a secondary synchronization signal that furnishes a cell identity group and one or more cell-specific parameters based on using a two-segment secondary synchronization sequence, wherein a phase rotation encoding of at least one of the one or more cell-specific parameters is applied to the secondary synchronization signal; and
   a transmit module configured to transmit the primary and secondary synchronization signals.

5. A transmitter for a base station in an OFDMA system, comprising:
   a primary module configured to provide a primary synchronization signal that furnishes a partial cell identity;
   a secondary module configured to provide a secondary synchronization signal that furnishes a cell identity group and one or more cell-specific parameters based on using a two-segment secondary synchronization sequence, wherein at least one of the one or more cell-specific parameters is jointly encoded with the cell identity group; and
   a transmit module configured to transmit the primary and secondary synchronization signals.

6. A transmitter for a base station in an OFDMA system, comprising:
   a primary module configured to provide a primary synchronization signal that furnishes a partial cell identity;
   a secondary module configured to provide a secondary synchronization signal that furnishes a cell identity group and one or more cell-specific parameters based on using a two-segment secondary synchronization sequence, wherein at least one of the one or more cell-specific parameters indicates frame timing; and
   a transmit module configured to transmit the primary and secondary synchronization signals.

7. A transmitter for a base station in an OFDMA system, comprising:
   a primary module configured to provide a primary synchronization signal that furnishes a partial cell identity;
   a secondary module configured to provide a secondary synchronization signal that furnishes a cell identity group and one or more cell-specific parameters based on using a two-segment secondary synchronization sequence, wherein at least one of the one or more cell-specific parameters indicates antenna configuration; and
   a transmit module configured to transmit the primary and secondary synchronization signals.

8. A method of operating a transmitter for a base station in an OFDMA system, comprising:
   providing a primary synchronization signal that furnishes a partial cell identity;
   providing a secondary synchronization signal that furnishes a cell identity group and one or more cell-specific parameters based on using a two-segment secondary synchronization sequence, wherein the primary and secondary synchronization signals occupy substantially a same set of centric frequency sub-carriers for their respective signals; and
   transmitting the primary and secondary synchronization signals.

9. A method of operating a transmitter for a base station in an OFDMA system, comprising:
   providing a primary synchronization signal that furnishes a partial cell identity;
   providing a secondary synchronization signal that furnishes a cell identity group and one or more cell-specific parameters based on using a two-segment secondary synchronization sequence, wherein the two-segment secondary synchronization sequence provides first and second sequences that are interleaved in the frequency domain; and
   transmitting the primary and secondary synchronization signals.

10. A method of operating a transmitter for a base station in an OFDMA system, comprising:
    providing a primary synchronization signal that furnishes a partial cell identity;
    providing a secondary synchronization signal that furnishes a cell identity group and one or more cell-specific parameters based on using a two-segment secondary synchronization sequence, wherein the two-segment secondary synchronization sequence provides first and second sequences that are length—31 binary M-sequences; and
    transmitting the primary and secondary synchronization signals.

11. A method of operating a transmitter for a base station in an OFDMA system, comprising:
    providing a primary synchronization signal that furnishes a partial cell identity;
    providing a secondary synchronization signal that furnishes a cell identity group and one or more cell-specific parameters based on using a two-segment secondary synchronization sequence, wherein a phase rotation encoding of at least one of the one or more cell-specific parameters is applied to the secondary synchronization signal; and
    transmitting the primary and secondary synchronization signals.

12. A method of operating a transmitter for a base station in an OFDMA system, comprising:
    providing a primary synchronization signal that furnishes a partial cell identity;
    providing a secondary synchronization signal that furnishes a cell identity group and one or more cell-specific parameters based on using a two-segment secondary synchronization sequence, wherein at least one of the one or more cell-specific parameters is jointly encoded with the cell identity group; and
    transmitting the primary and secondary synchronization signals.

13. A method of operating a transmitter for a base station in an OFDMA system, comprising:

providing a primary synchronization signal that furnishes a partial cell identity;
providing a secondary synchronization signal that furnishes a cell identity group and one or more cell-specific parameters based on using a two-segment secondary synchronization sequence, wherein at least one of the one or more cell-specific parameters indicates frame timing; and
transmitting the primary and secondary synchronization signals.

14. A method of operating a transmitter for a base station in an OFDMA system, comprising:
providing a primary synchronization signal that furnishes a partial cell identity;
providing a secondary synchronization signal that furnishes a cell identity group and one or more cell-specific parameters based on using a two-segment secondary synchronization sequence, wherein at least one of the one or more cell-specific parameters indicates antenna configuration; and
transmitting the primary and secondary synchronization signals.

15. A receiver for user equipment in an OFDMA system, comprising:
a receive module configured to receive primary and secondary synchronization signals;
a primary processing module configured to obtain a partial cell identity from the primary synchronization signal; and
a secondary processing module configured to obtain a cell identity group and one or more cell-specific parameters from the secondary synchronization signal based on using a two-segment secondary synchronization sequence, wherein the primary and secondary synchronization signals occupy substantially a same set of centric frequency sub-carriers for their respective signals.

16. A receiver for user equipment in an OFDMA system, comprising:
a receive module configured to receive primary and secondary synchronization signals;
a primary processing module configured to obtain a partial cell identity from the primary synchronization signal; and
a secondary processing module configured to obtain a cell identity group and one or more cell-specific parameters from the secondary synchronization signal based on using a two-segment secondary synchronization sequence, wherein the two-segment secondary synchronization sequence provides first and second sequences that are interleaved in the frequency domain.

17. A receiver for user equipment in an OFDMA system, comprising:
a receive module configured to receive primary and secondary synchronization signals;
a primary processing module configured to obtain a partial cell identity from the primary synchronization signal; and
a secondary processing module configured to obtain a cell identity group and one or more cell-specific parameters from the secondary synchronization signal based on using a two-segment secondary synchronization sequence, wherein the two-segment secondary synchronization sequence provides first and second sequences that are length—31 binary M-sequences.

18. A receiver for user equipment in an OFDMA system, comprising:
a receive module configured to receive primary and secondary synchronization signals;
a primary processing module configured to obtain a partial cell identity from the primary synchronization signal; and
a secondary processing module configured to obtain a cell identity group and one or more cell-specific parameters from the secondary synchronization signal based on using a two-segment secondary synchronization sequence, wherein a phase rotation encoding of at least one of the one or more cell-specific parameters is applied to the secondary synchronization signal.

19. A receiver for user equipment in an OFDMA system, comprising:
a receive module configured to receive primary and secondary synchronization signals;
a primary processing module configured to obtain a partial cell identity from the primary synchronization signal; and
a secondary processing module configured to obtain a cell identity group and one or more cell-specific parameters from the secondary synchronization signal based on using a two-segment secondary synchronization sequence, wherein at least one of the one or more cell-specific parameters is jointly encoded with the cell identity group.

20. A receiver for user equipment in an OFDMA system, comprising:
a receive module configured to receive primary and secondary synchronization signals;
a primary processing module configured to obtain a partial cell identity from the primary synchronization signal; and
a secondary processing module configured to obtain a cell identity group and one or more cell-specific parameters from the secondary synchronization signal based on using a two-segment secondary synchronization sequence, wherein at least one of the one or more cell-specific parameters indicates frame timing.

21. A receiver for user equipment in an OFDMA system, comprising:
a receive module configured to receive primary and secondary synchronization signals;
a primary processing module configured to obtain a partial cell identity from the primary synchronization signal; and
a secondary processing module configured to obtain a cell identity group and one or more cell-specific parameters from the secondary synchronization signal based on using a two-segment secondary synchronization sequence, wherein at least one of the one or more cell-specific parameters indicates antenna configuration.

22. A method of operating a receiver for user equipment in an OFDMA system, comprising:
receiving primary and secondary synchronization signals;
obtaining a partial cell identity from the primary synchronization signal; and
obtaining a cell identity group and one or more cell-specific parameters from the secondary synchronization signal based on using a two-segment secondary synchronization sequence, wherein the primary and secondary synchronization signals occupy substantially a same set of centric frequency sub-carriers for their respective signals.

23. A method of operating a receiver for user equipment in an OFDMA system, comprising:
receiving primary and secondary synchronization signals;

obtaining a partial cell identity from the primary synchronization signal; and obtaining a cell identity group and one or more cell-specific parameters from the secondary synchronization signal based on using a two-segment secondary synchronization sequence, wherein the two-segment secondary synchronization sequence provides first and second sequences that are interleaved in the frequency domain.

24. A method of operating a receiver for user equipment in an OFDMA system, comprising:

receiving primary and secondary synchronization signals;

obtaining a partial cell identity from the primary synchronization signal; and obtaining a cell identity group and one or more cell-specific parameters from the secondary synchronization signal based on using a two-segment secondary synchronization sequence, wherein the two-segment secondary synchronization sequence provides first and second sequences that are length—31 binary M-sequences.

25. A method of operating a receiver for user equipment in an OFDMA system, comprising:

receiving primary and secondary synchronization signals;

obtaining a partial cell identity from the primary synchronization signal; and obtaining a cell identity group and one or more cell-specific parameters from the secondary synchronization signal based on using a two-segment secondary synchronization sequence, wherein a phase rotation encoding of at least one of the one or more cell-specific parameters is applied to the secondary synchronization signal.

26. A method of operating a receiver for user equipment in an OFDMA system, comprising:

receiving primary and secondary synchronization signals;

obtaining a partial cell identity from the primary synchronization signal; and obtaining a cell identity group and one or more cell-specific parameters from the secondary synchronization signal based on using a two-segment secondary synchronization sequence, wherein at least one of the one or more cell-specific parameters is jointly encoded with the cell identity group.

27. A method of operating a receiver for user equipment in an OFDMA system, comprising:

receiving primary and secondary synchronization signals;

obtaining a partial cell identity from the primary synchronization signal; and obtaining a cell identity group and one or more cell-specific parameters from the secondary synchronization signal based on using a two-segment secondary synchronization sequence, wherein at least one of the one or more cell-specific parameters indicates frame timing.

28. A method of operating a receiver for user equipment in an OFDMA system, comprising:

receiving primary and secondary synchronization signals;

obtaining a partial cell identity from the primary synchronization signal; and obtaining a cell identity group and one or more cell-specific parameters from the secondary synchronization signal based on using a two-segment secondary synchronization sequence, wherein at least one of the one or more cell-specific parameters indicates antenna configuration.

* * * * *